(No Model.)

M. RAPHAEL.
SAND BAND FOR VEHICLE WHEELS.

No. 291,936. Patented Jan. 15, 1884.

WITNESSES:
W. T. Robertson
Edwin H. Bond

INVENTOR
Meyer Raphael
BY T. J. W. Robertson
ATTORNEY.

United States Patent Office.

MEYER RAPHAEL, OF WADSWORTH, NEVADA.

SAND-BAND FOR VEHICLE-WHEELS.

SPECIFICATION forming part of Letters Patent No. 291,936, dated January 15, 1884.

Application filed April 19, 1883. (No model.)

*To all whom it may concern:*

Be it known that I, MEYER RAPHAEL, a citizen of the United States of America, residing at Wadsworth, in the county of Washoe and State of Nevada, have invented certain new and useful Improvements in Sand-Guards, of which the following is a specification, reference being had therein to the accompanying drawings.

This invention relates to an improvement in sand-guards; and it consists in the peculiar construction and arrangement of parts hereinafter described and claimed.

Figure 1:
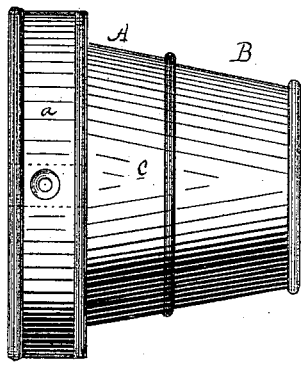
Figure 2:
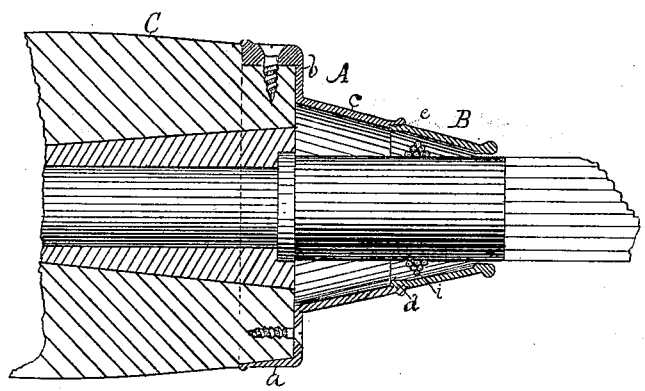
Figure 3:
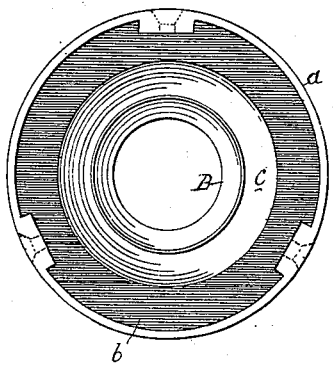

In the accompanying drawings, Figure 1 is a side elevation of my improvement; Fig. 2, a vertical section thereof in position on a hub; and Fig. 3, an end view, showing the inside of the device when detached.

A represents one section of the guard, consisting of a hub-band, $a$, a straight flange, $b$, and a tapering portion, $c$, all made in one piece, and having a screw-thread, $d$, cut on the inside of the tapering portion.

B represents the other section, having a screw-thread, $e$, cut on it to fit the thread $d$ on section A, so that both parts may be readily and firmly secured together. If preferred, instead of this screw-joint, a "bayonet-joint" or any other form of fastening may be used.

In using this device, section A is driven firmly upon the hub C, and fastened thereby screws or otherwise. The section B is placed upon the axle D, and a cord or wire is preferably wound around the latter at $i$, and then the wheel is put on the axle and section B screwed into section A. By this means a perfect sand-guard is formed that, besides keeping off all dirt from the bearing, will make a very handsome finish to the wheel, as the sand-guard and hub-band can be plated with any metal desired to form a finish corresponding with the rest of the fittings of the hub.

I do not limit myself to the exact construction shown except when so claimed, as it is evident that it may be changed without departing from the spirit of my invention. For instance, instead of the sections being tapered or conical, they may be cylindrical and have a flange at the end farthest from the hub, extending inward to receive the openings. The conical or tapering form of the sand-guard has a great advantage, however, as the tendency of this is to retain all of the lubricating material near the hub, for the centrifugal force generated by the revolution of the wheel tends to carry everything away from the small end of the sand-guard toward the hub.

The hub-band may be dispensed with, and the sand-guard fastened upon the hub by a screw passing through the flange $b$. This will be found useful in applying the device to wheels already in use.

I have shown a wire or cord at $i$, but do not limit myself to this, as it is obvious that the sand-guard will be extremely useful without said wire or cord.

I have shown the axle as round in that portion inclosed by the sand-guard; but it is evident that it may be used on square axles by making the opening in the guard large enough. In some cases, in lieu of the cord or wire, I propose to put on a movable metallic washer, which may be made in two parts, so as to be readily put on and secured in its place.

Anything novel shown or described in this application and not claimed I reserve the right to cover by a separate application.

What I claim as new is—

As a new article of manufacture, a sand-guard consisting of two sections, A and B, said section A having the band $a$, adapted to fit the outside of the hub, the flange $b$, and tapering portion $c$, terminating in an opening provided with a screw-thread, and the tapering section B, screw-threaded at its larger end to fit the screw-thread of section A, all constructed and arranged substantially as and for the purpose specified.

In testimony whereof I affix my signature, in presence of two witnesses, this 26th day of March, 1883.

MEYER RAPHAEL.

Witnesses:
T. J. W. ROBERTSON,
C. P. WEBSTER.